(12) United States Patent
Hinds et al.

(10) Patent No.: US 6,745,550 B1
(45) Date of Patent: Jun. 8, 2004

(54) SUGAR CANE HARVESTER HAVING AN ARRANGEMENT FOR STEERING THE CROP DIVIDERS AND TOPPER MECHANISM TOGETHER WITH THE WHEELS

(75) Inventors: Michael Lynn Hinds, Thibodaux, LA (US); Neville Harold Toft, Bundaberg (AU)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/393,959

(22) Filed: Mar. 21, 2003

(51) Int. Cl.7 .............................................. A01D 45/10
(52) U.S. Cl. ......................................... 56/13.9; 56/13.3
(58) Field of Search ................................. 56/13.3, 13.7, 56/13.9, 14.3, 14.5, 12.9, 16.4 R, 16.5, 119, 1, 56, 63; 460/57, 97, 123

(56) References Cited

U.S. PATENT DOCUMENTS

| | | | | |
|---|---|---|---|---|
| 3,599,404 A | * | 8/1971 | Fernandez et al. | ........... 56/12.8 |
| 4,170,098 A | * | 10/1979 | Moreno et al. | ............... 56/13.9 |
| 5,379,577 A | * | 1/1995 | Caillouet | .................... 56/14.3 |
| 5,414,981 A | * | 5/1995 | Landry et al. | ................. 56/249 |
| 6,076,340 A | * | 6/2000 | Fowler | ........................ 56/13.9 |

OTHER PUBLICATIONS

CAMECO Industries, Inc, CAMECO Cane Combine Harvesters, Nov. 1993, pp. 1–6, featuring models CHT–2500 and CHW–2500.
http://www.casecorp.com/apac/agricultural/newequip/austoft/7000.html ,Case IH Austoft 7000 Series Cane Harvester, Copyright 2000, Case Corporation, (manually printed Apr. 21, 2001), pp. 1–2.

* cited by examiner

*Primary Examiner*—Robert E. Pezzuto (57) ABSTRACT

A self-propelled chopper cane harvester is equipped with a front frame section including opposite sides which are each mounted for pivoting about a respective upright pivot axis. Respectively mounted to the opposite sides of the front frame section are front wheels and row dividers. A steering cylinder is mounted for pivoting the frames to opposite sides of a straight ahead position to thereby effect steering of the front wheels. A topper mechanism is mounted so as to pivot or turn in response to the steering of the harvester.

8 Claims, 8 Drawing Sheets

SUGAR CANE HARVESTER HAVING AN ARRANGEMENT FOR STEERING THE CROP DIVIDERS AND TOPPER MECHANISM TOGETHER WITH THE WHEELS

FIELD OF THE INVENTION

The present invention relates to sugar cane harvesters and more particularly relates to steering arrangements for such harvesters.

BACKGROUND OF THE INVENTION

The steering arrangement on a typical front wheel steered, rubber tired sugar cane chopper harvester includes steerable wheels mounted to axles supported for pivoting about respective upright pivot structures located outboard of transversely spaced, fore-and-aft extending main frame members. A pair of crop dividers are respectively mounted to the main frame ahead of the pair of steerable wheels. In order to avoid interference with the frame members during steering operation, a large space is provided between each pivot axis and the adjacent frame member.

A first disadvantage of the known steering geometry is that, in order to reposition the harvester on the field headland for entering a new row of cane to be harvested after exiting a row just harvested, an operator must not only turn the steerable wheels but also must do a series of machine reversals in order to enter the new row without damaging the cane. This same sequence may also be repeated at the end of the field when exiting the row and turning onto the headland. In this case, the rear of the machine may be backed into the uncut field, knocking cane down and damaging the crop. With short rows and narrow headlands, the time spent maneuvering existing machines can be longer than the time spent harvesting.

A second disadvantage of the known steering geometry is that of restricting the width of the machine throat for accepting crop for being separated from the ground by a pair of counter rotating base cutters located between the main frame members. This restricted feed throat causes a problem referred to as glut/starve feeding when cutting heavily lodged, green cane. The problem begins when stalks of cane bridge the throat and momentarily starve the flow of cane into the machine. When enough cane accumulates to either bend or break the bridged stalks, a glut of cane is fed into the machine. If the cane processing elements located past the throat have enough capacity, the glut of cane will go through the machine, although the quality of the cane exiting the machine will be reduced. If the glut is too large, a choke will occur which will result in machine stoppage to clear it.

SUMMARY OF THE INVENTION

According to the present invention, there is provided an improved steering arrangement for a rubber tired chopper cane harvester.

An object of the invention is to provide a steering arrangement which results in a geometry defining an increased throat width for receiving crop.

A more specific object of the invention is to provide a steering arrangement whereby the steerable wheels are mounted for movement together with respective frame sections that are mounted for pivoting about upright axes, whereby the wheels may be mounted close to the frame sections without any possibility of interference, thereby permitting the frame sections to be spaced from each other so as to increase the throat width for receiving crop.

Another specific object is to provide a steering arrangement, as defined in the immediately preceding object, wherein in addition to the steerable wheels, the crop dividers are also respectively coupled for pivoting with the frame sections.

Still another object of the invention is to provide a steering arrangement wherein the topper mechanism is steered in response to steering the vehicle.

These and other objects will become apparent from a reading of the ensuing description together with the appended drawings.

DESCRIPTION OF THE PREFERRED EMBODIMENT

Figure 1:
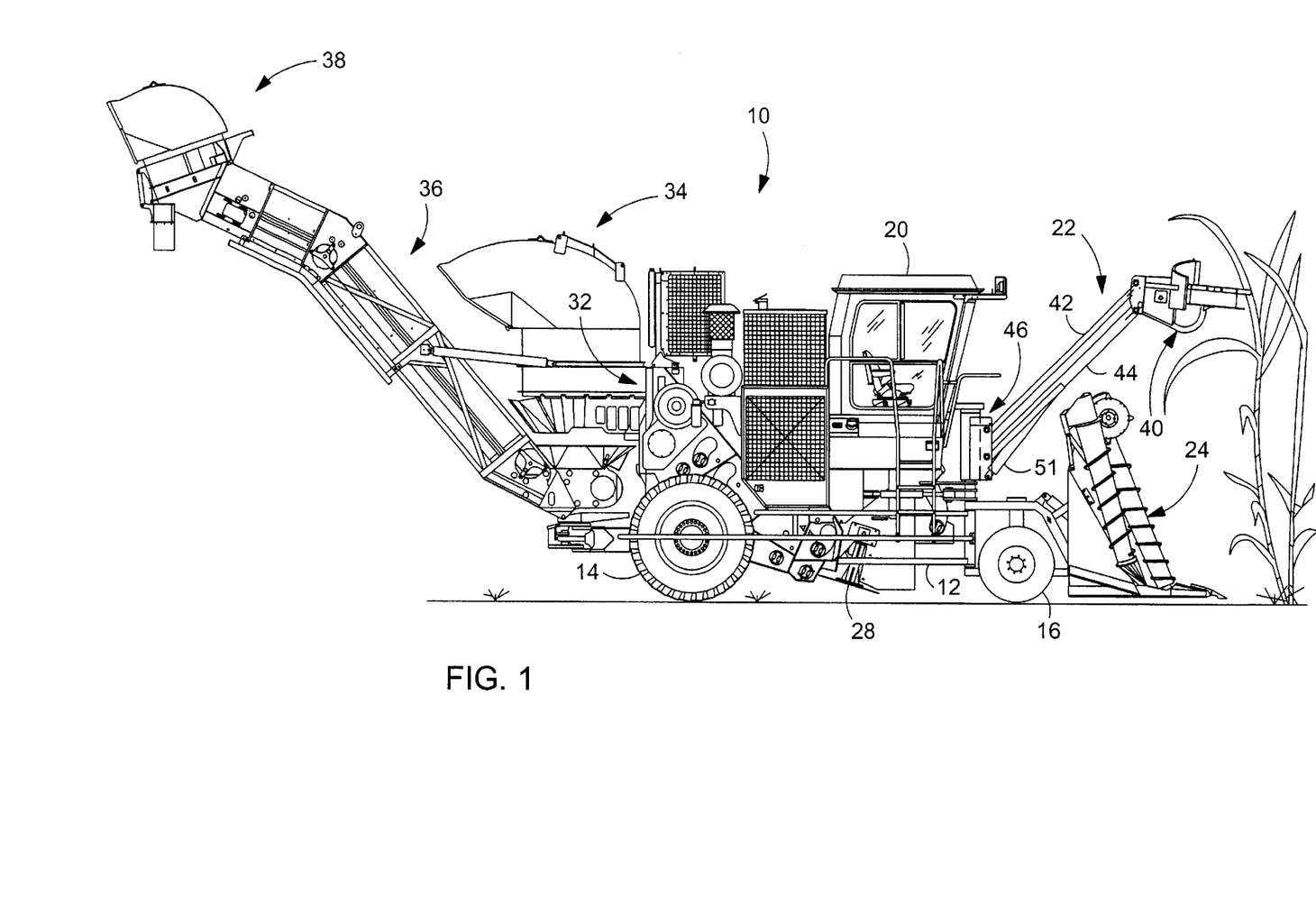
FIG. 1 is a right side elevational view of a sugar cane chopper harvester embodying the present invention.
Figure 2:
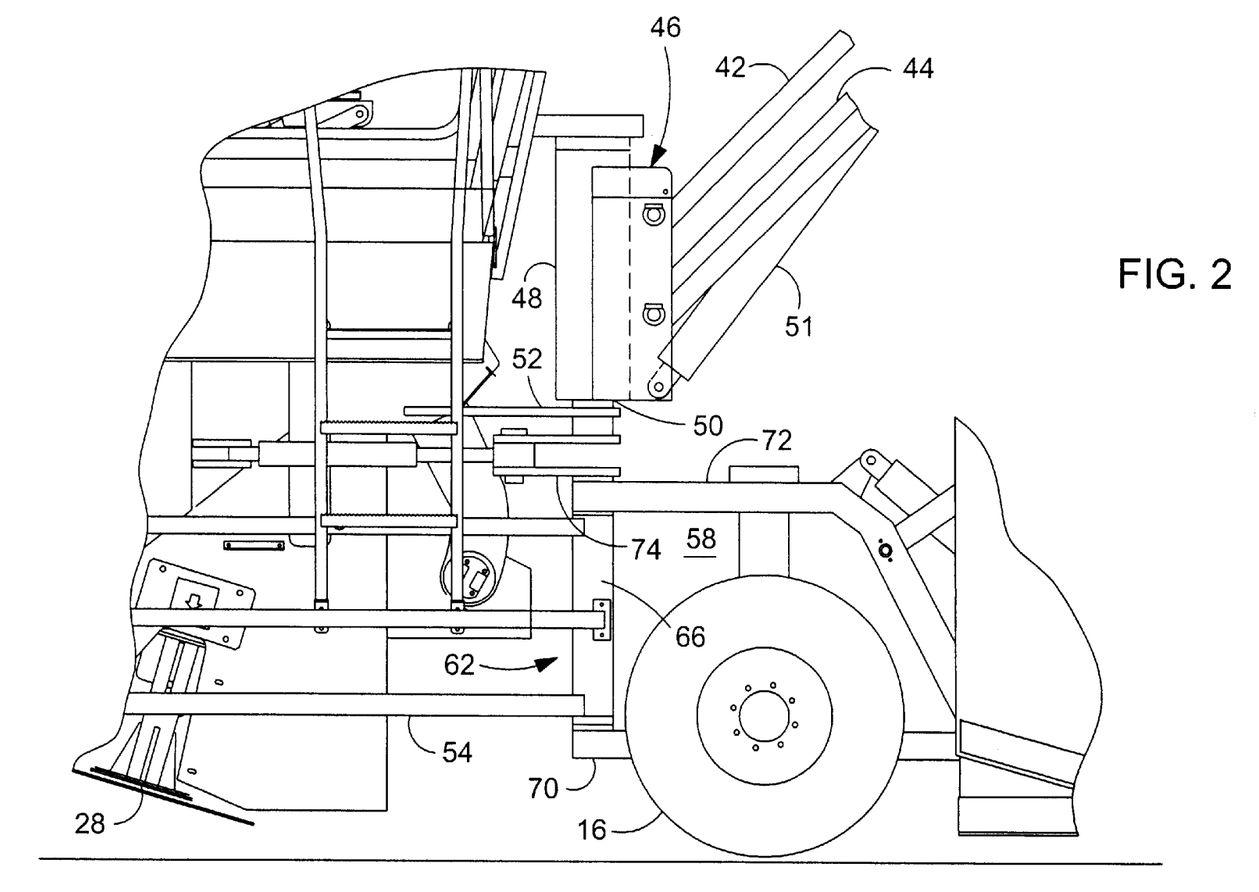
FIG. 2 is a fragmentary right side elevational view showing the respective articulated connections between the harvester main frame and the right wheel and topper mechanism.
Figure 3:
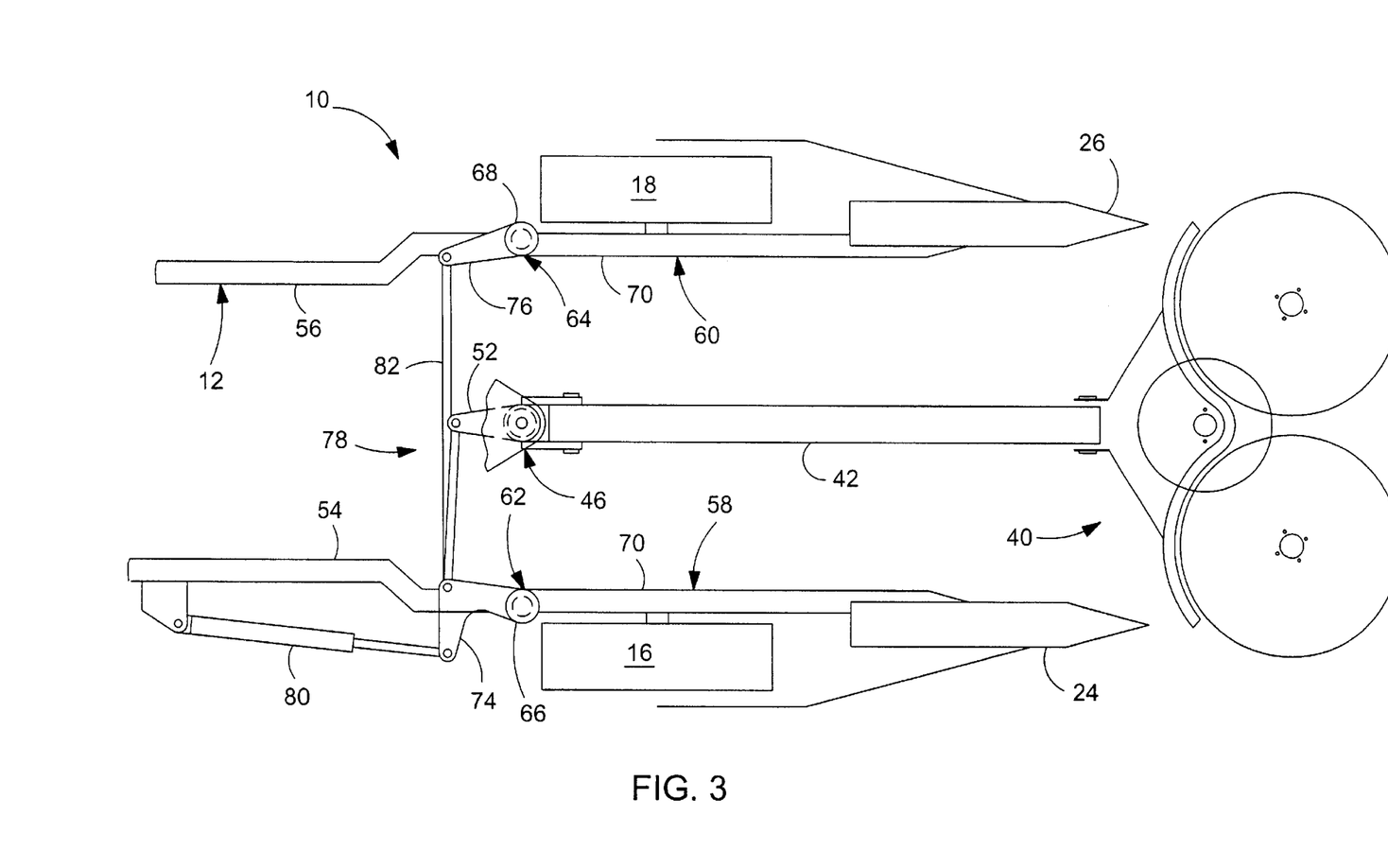
FIG. 3 is a schematic top view showing the power steering cylinder and linkage for effecting steering of the front wheels together with the crop dividers and topper mechanism.

Referring now to FIGS. 1–3, there is shown a sugar cane chopper harvester 10, here depicted as a rubber tired, chopper harvester. The harvester 10 includes a main frame 12 supported on a pair of rear drive wheels 14 and a pair of steerable front wheels 16 and 18, respectively. An operator cab 20 is located at a central, forward location of the frame 12, and located behind the cab 20 is an engine, (not visible), which provides the power for driving the wheels 14 and other driven components of the harvester 10.

The cab 20 gives a seated or standing operator a vantage point for viewing the operation of front-mounted equipment including a topper mechanism 22 mounted to the frame 12 between right- and left-hand crop divider assemblies 24 and 26, respectively. Located just behind and inwardly of the front wheels 16 and 18 of the harvester 10, so as to be at opposite sides of a longitudinal centerline of the harvester, are right- and left-hand base cutter units 28 and 30, respectively, having cutting blades located so as to overlap at the middle of the harvester.

Thus, during operation, the crop divider assemblies 24 and 26 straddle a row of cane stalks which pass beneath the frame 12 and are severed from the ground by the base cutter units 28 and 30. The base cutter units 28 and 30 deliver the stalks to the rear to a feed roller assembly (not shown) that transports the cane stalks to a chopper assembly 32 located between and at a height above the rear wheels 14. The chopper assembly 32 cuts the cane stalks into lengths called billets which are fed into a primary extractor assembly 34 that operates to clean unwanted material such as leaves and other crop pieces from the billets. The billets then pass into a loading elevator assembly 36 to a secondary extractor assembly 38 which acts to extract further trash from the billets as they are conveyed to a wagon, or the like, that is pulled alongside the harvester 10.

The topper mechanism 22 includes a gathering and cutting head 40 that is kept in a level attitude by being mounted to the frame 12 by a boom including upper and lower parallel arms 42 and 44, respectively. The rear ends of the arms 42 and 44 are respectively pivotally coupled to a swing frame 46 including a tubular member 48 mounted for swinging about a vertical axis defined by a cylindrical support post 50 that is fixed to a central location of the main frame 12 just below a lower region of the cab 20. An extensible and retractable boom actuator 51 is coupled between the swing frame 46 and the lower arm 44 and is operable for controlling the operating height of the cutting head 40. Fixed to a lower end of the support post 50 is a steering arm 52.

The main frame 12 includes right- and left-hand side members 54 and 56, respectively, to the forward ends of which right- and left-hand forward frame sections 58 and 60 are respectively coupled by right- and left-hand pivot assemblies 62 and 64, of which only the details of the right-hand pivot assembly 62 are shown, it being understood that the left-hand pivot assembly 64 is similar. The right- and left-hand pivot assemblies 62 and 64 include respective vertical cylindrical, tubular receptacles 66 and 68 forming forward ends of the side members 54 and 56, and respective pivot pins or posts (not shown) respectively received for oscillating within the receptacles 66 and 68 and fixed to rear ends of top and bottom, horizontal frame members 70 and 72, respectively, of the right- and left-hand front frame sections 58 and 60. The front wheels 16 and 18 are mounted to respective axles carried by the forward frame sections 58 and 60 of the main frame 12. Also mounted to the front frame section 58 and 60 are the right- and left-front crop divider assemblies 24 and 26, respectively. Fixed to the top of the right pivot post is an L-shaped right wheel steering arm 74. A left wheel steering arm 76 is fixed to the top of the left pivot post carried in the receptacle 68 at the front of the left front frame side member 56.

Provided for simultaneously steering the wheels 16 and 18 and the associated divider assemblies 24 and 24 together with the topping assembly 22, is a steering arrangement 78 including an extensible and retractable steering cylinder 80 coupled between the main frame 12 and the right steering arm 74. Coupled between the right and left steering arms 74 and 76 is a tie rod 82, and coupled between the right steering arm 74 and the steering arm 52 of the topper mechanism 22 is a drag link 84. It is, of course, evident to those skilled in the art, that the steering cylinder 80 could be mounted between main frame 12 and the swing frame 46 or it could be mounted between the main frame 12 and the left wheel steering arm 72.

Figures 4, 5:
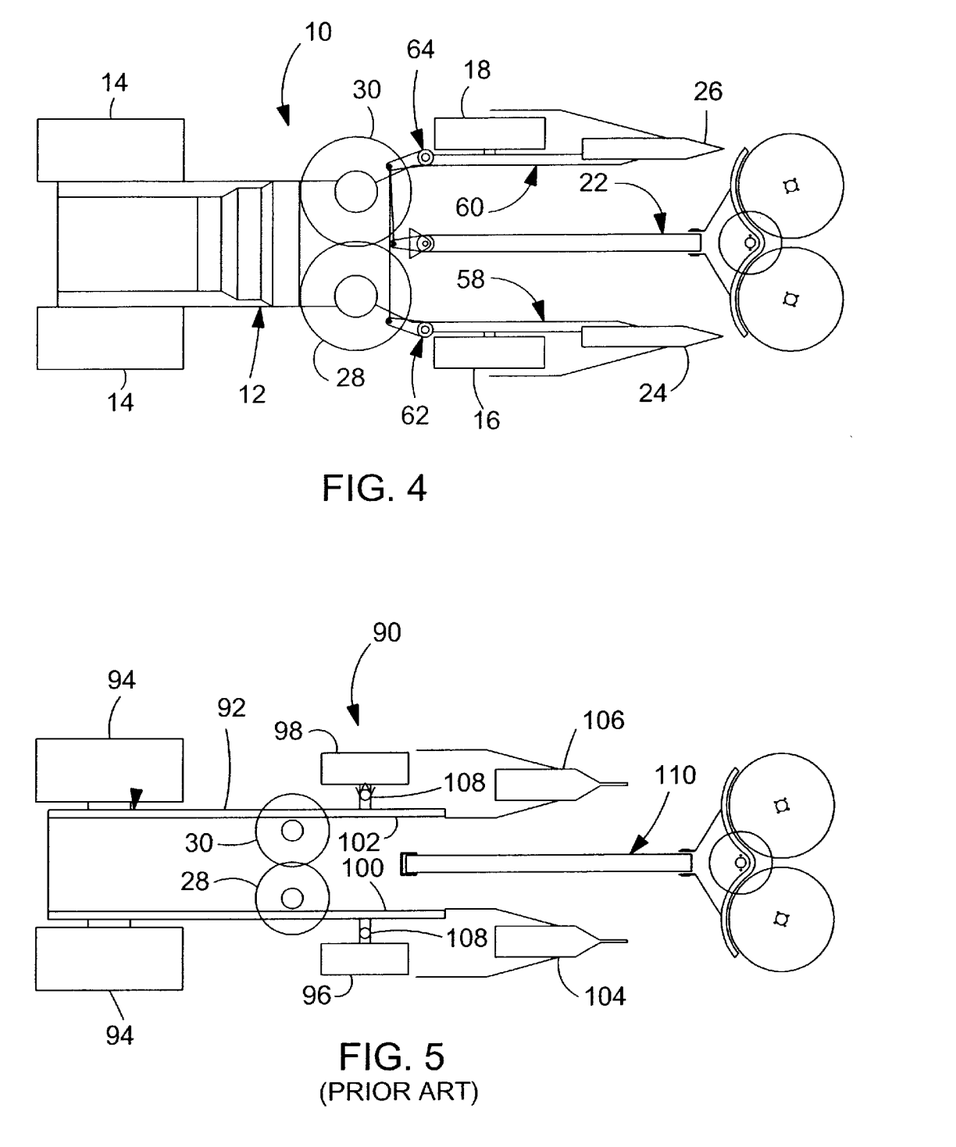
FIGS. 4 and 5 are schematic top views respectively of a cane chopper harvester embodying the invention and a prior art cane chopper harvester, with both harvesters being shown in a condition for traveling straight ahead.

Referring now to FIG. 4, it can be seen that the main frame 12 is widened in the vicinity of the base cutter assemblies 28 and 30. In one practical example, the width dimension of the frame 12, from its rear to a location adjacent the base cutter assemblies 28 and 30, is about 36 inches, which is a typical width for the entire frame of a prior art harvester. The opposite sides of the frame 12 flare outwardly, in the vicinity of the base cutter assemblies 28 and 30, to a width dimension of about 50 inches for a total increase in width of about 14 inches. Thus, the front frame sections 62 and 64 are separated by about 50 inches, and since the crop divider assemblies 24 and 26 are joined to the front frame sections 62 and 64, the throat of the harvester for receiving crop, i.e., the distance between the crop divider assemblies 24 and 26, is also about 50 inches.

Referring now also to FIG. 5, there is shown a prior art cane harvester 90 including a main frame 92 supported on rear drive wheels 94 and steerable front wheels 96 and 98. The main frame 92 includes right- and left-hand side members 100 and 102 that extend parallel to each other and have crop divider assemblies 106 and 108 respectively mounted to forward ends thereof. The steerable wheels 96 and 98 are carried by axles mounted for pivoting about upright pivot axes 110 respectively defined by supports fixed to the frame side members 100 and 102. Further, a topper mechanism 108 is mounted centrally between the side members 100 and 102 for operation along the longitudinal center line of the harvester 90.

Figure 4A:
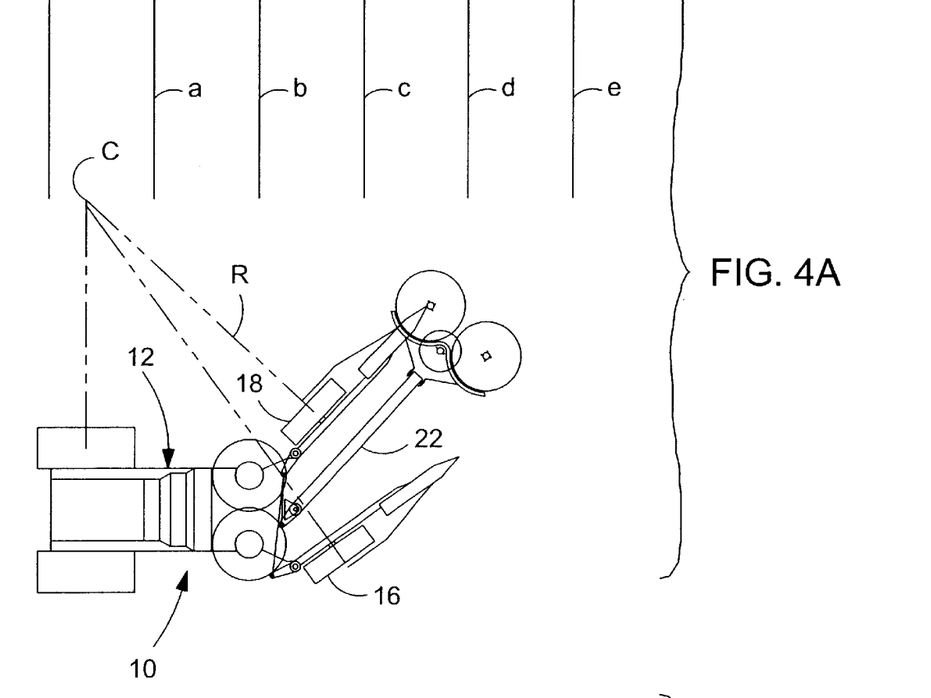
FIGS. 4A–4D are schematic top views respectively showing the chopper cane harvester of the present invention in a sequence of positions while turning on a sugar cane field headland so as to enter a new row of cane to be harvested.
Figure 5A:
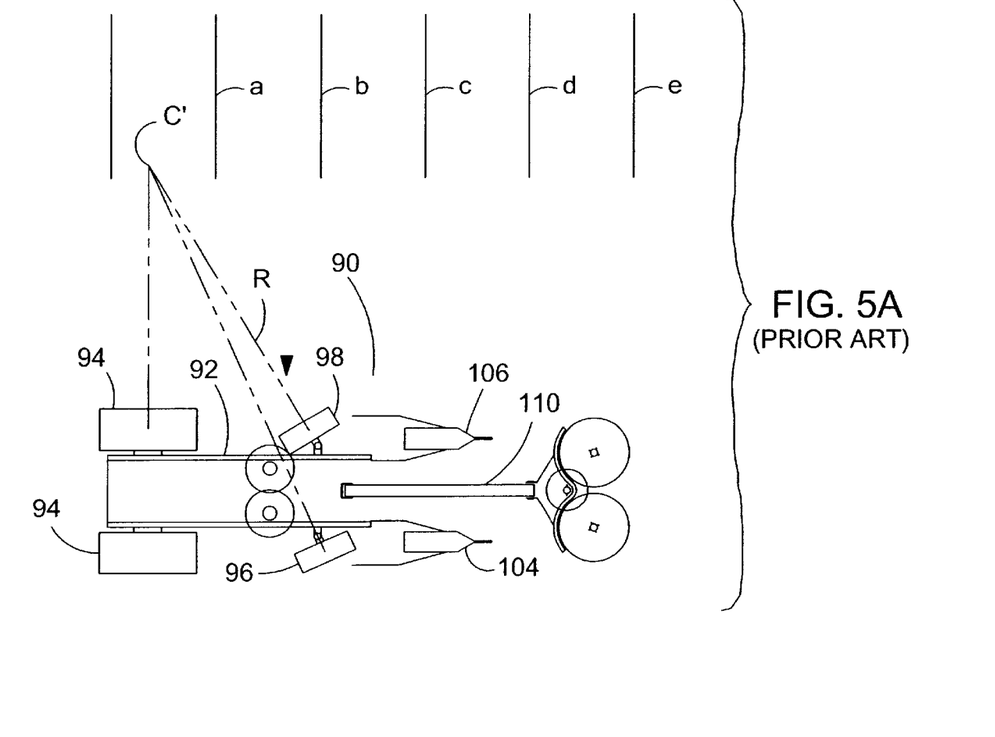
FIGS. 5A–5D are schematic top views showing the prior art chopper cane harvester in a sequence of positions while turning on a sugar cane field headland, this sequence of positions being respectively provided for comparison with those illustrated in FIGS. 4A–4D.

Referring now to FIGS. 4A and 5A, the cane chopper harvesters 10 and 90 are shown in similar locations in the headland of a sugar cane field, wherein their respective sets of rear drive wheels 14 and 94 are aligned with a path of travel that extends perpendicular to, and is equidistant from ends of, a plurality of sugar cane rows a–f. A typical distance between the rows is 60" and a typical headland would be approximately equal to four rows in width or about 20'.

Referring to FIG. 5A, it can be seen that the turning radius R of the prior art harvester 90 is limited by the inside steerable wheel 98 coming into contact with the frame 92. With one practical example, the turning radius R is approximately 15', this being the distance between the center of the inside wheel during a turn and the turning center C', which is at the intersection of a first line drawn through the centers of the rear wheels 94 and a line drawn perpendicular to the path of travel of, and through the center of, the inside steerable wheel 98.

Referring to FIG. 4A, the same turning radius R of the cane harvester 10 is achieved by turning the front frame sections 58 and 60 of the proposed cane harvester 10, as required, by operation of the steering cylinder 80.

Figure 4B:
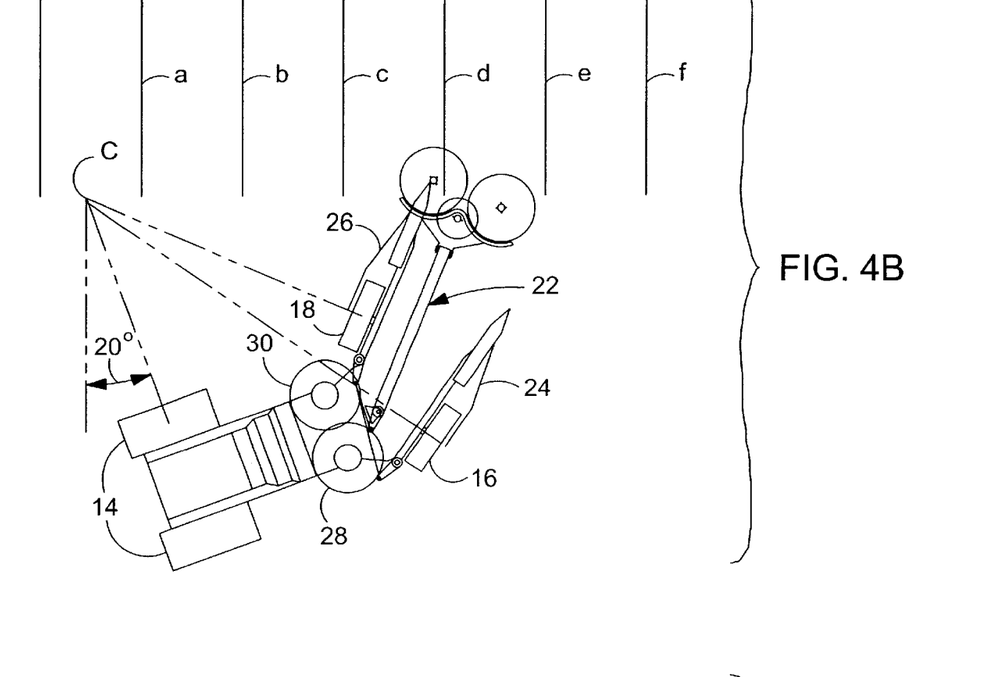
Figure 5B:
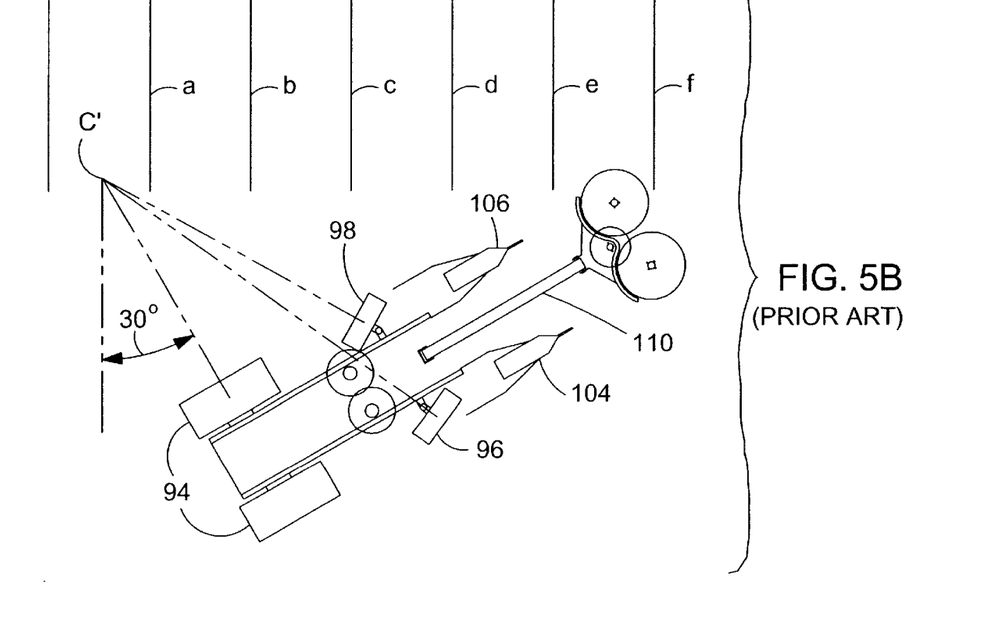

Referring to FIGS. 4B and 5B, it can be seen that, after the proposed harvester 10 turns through an angle of 20°, the topper mechanism of the harvester 10 will just begin to enter the same row d that is intended to be harvested next. In contrast, the prior art harvester 90, after turning through an angle of 30°, will begin to enter row f, which is two rows from the row d. which the harvester 92 will eventually enter.

Figure 4C:
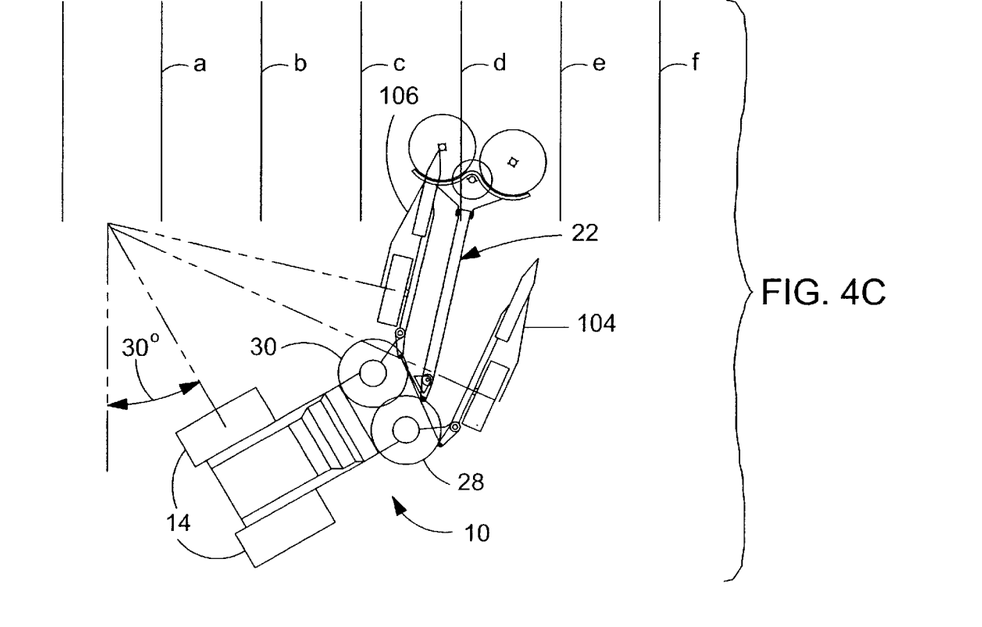
Figure 5C:
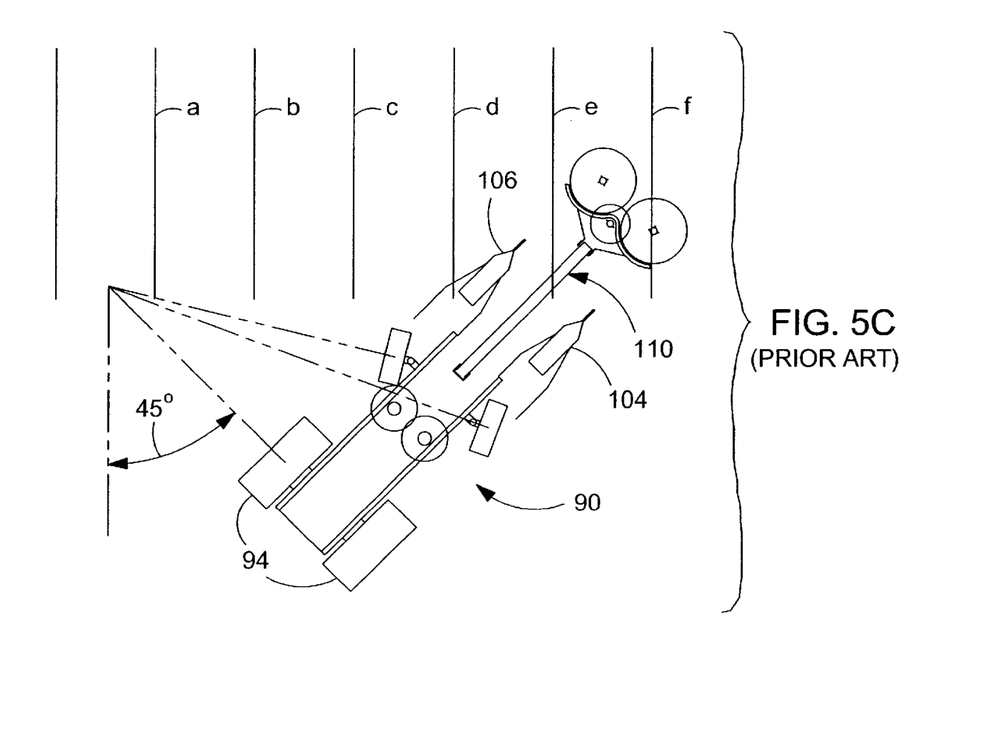

Referring now to FIGS. 4C and 5C, it can be seen that after pivoting through an angle of 30°, the topper mechanism 22 of the proposed harvester 10 continues to be aligned with the row d intended to be harvested next and the left row divider 106 is entering the area between the rows c and d as desired for harvesting the row d. In comparison, the prior art harvester 90, after pivoting through an angle of 45°, the topper mechanism is still two rows beyond the row d intended to be harvested next and the left row divider 106 is beginning to knock down plants located in the row d.

Figure 4D:
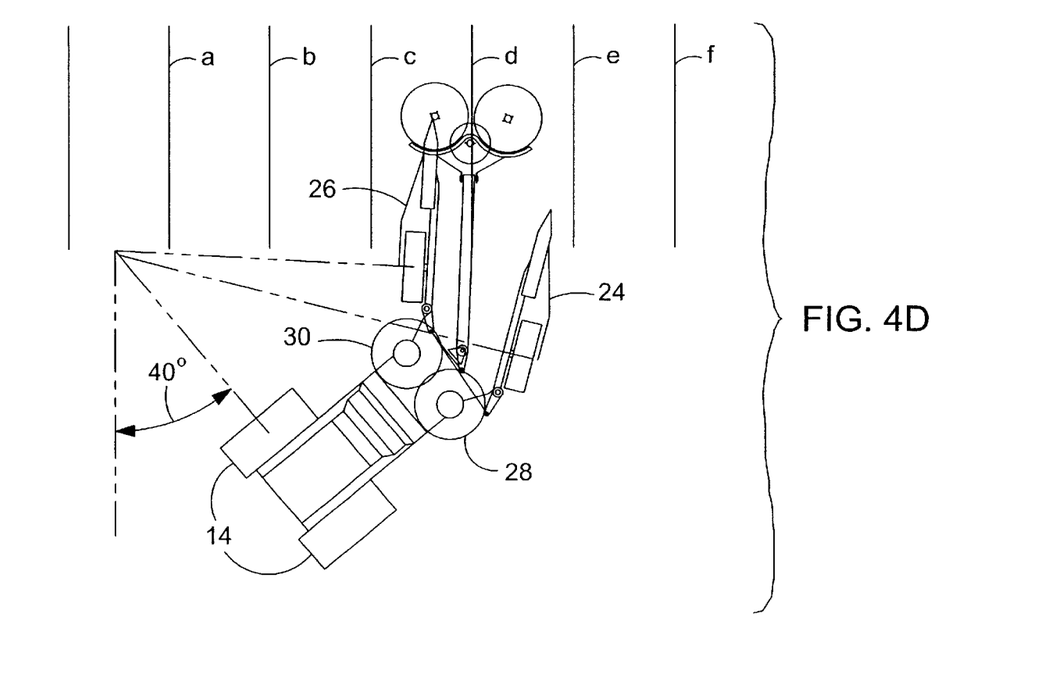
Figure 5D:
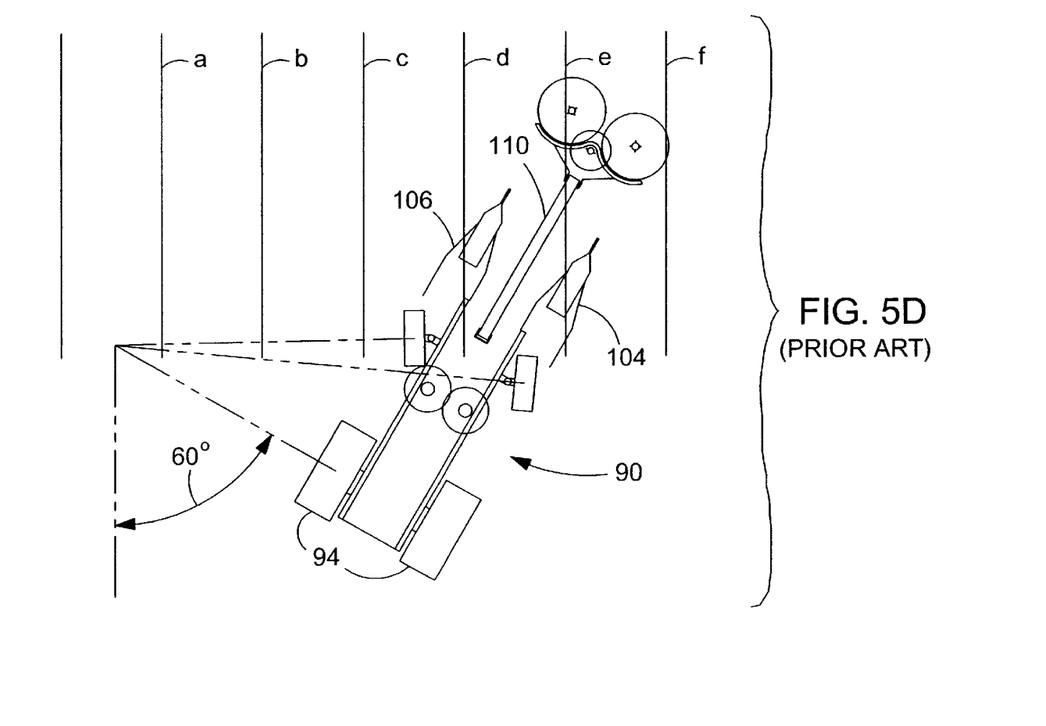

Referring next to FIGS. 4D and 5D, it can be seen that, after turning through an angle of 40°, the proposed harvester 10 is almost perfectly aligned with the cane row d, as desired. This is in comparison to the prior vehicle 90, which after rotating through an angle of 60°, is positioned such that the wheels 96 and 98 are properly aligned for harvesting the row d. However, the left row divider 106 will have knocked over more of the crop in the row d and the right row divider will have knocked down crop in the neighboring row e. Thus, it will be apparent that the topper mechanism 108 will not be positioned properly for beginning the topping of the row d.

In normal operations, the operator of the prior art harvester 90 will, at a time prior to reaching the position shown in FIG. 4B, raise the cutting head of the topper mechanism 108 to a level above the height of the cane by extending the boom actuator (not shown). The operator, instead of turning in one continuous motion, as described above with reference to FIGS. 4B–4D, will then proceed to do a series of machine reversals until the crop dividers 104 and 106 can enter the field correctly. At this point, the cutting head of the topper mechanism 108 is lowered to the correct operating height by retracting the boom actuator. Unless the headland is sufficiently wide to accommodate the reversing movement of the harvester 90, the first stalks in the row of cane to be harvested will not be topped.

However, in the case of the proposed harvester 10, the cutting head 40 of the topper mechanism 22 can be left at the same topping height during the whole turning sequence. With a 21' wide headland as illustrated, no machine reversals are required to position the harvester 10 correctly with the row of cane to be harvested.

Having described the preferred embodiment, it will become apparent that various modifications can be made without departing from the scope of the invention as defined in the accompanying claims.

What is claimed is:

1. In a self-propelled cane harvester, including a main frame supported on a pair of rear drive wheels, a pair of front steerable wheels, a topper mechanism mounted to a forward location of the main frame, and a pair of row dividers respectively mounted to forward ends of opposite sides of said main frame, an improved steering arrangement comprising: said main frame including transversely spaced right- and left-hand front frame sections respectively mounted to a remaining section of the main frame for pivoting about right- and left-hand transversely spaced, vertical axes; said pair of steerable wheels being mounted one on each of said rightand left-hand front frame sections; and a powered device being operatively coupled to said right- and left-hand front frame sections for selectively steering them to opposite sides of a straight ahead position wherein they dispose the wheels for traveling along a straight path.

2. The self-propelled cane harvester, as defined in claim 1, wherein said pair of row dividers are mounted one on each of said right- and left-hand front frame sections, whereby they are steered together with said pair of wheels.

3. The self-propelled cane harvester, as defined in claim 2, wherein said remaining section of said main frame includes right- and left-hand front end portions that are offset outwardly relatively to a longitudinal center line of said harvester; and said right- and left-hand front frame sections being respectively pivotally coupled to said right- and left-hand front end portions of said main frame, whereby an increased throat area is presented between said row dividers for receiving cane stalks.

4. The self-propelled cane harvester, as defined in claim 1, wherein said topper mechanism includes a boom mounted to said frame for pivoting about an upright swing axis located centrally between said right- and left-hand front frame sections; and said powered device being coupled to said boom for swinging it in concert with said right- and left-hand frame sections.

5. The self-propelled cane harvester, as defined in claim 1, wherein said powered device is an extensible and retractable hydraulic actuator connected between said remaining section of said frame; and one of said right- and left-hand frame sections; and a frame steering linkage coupled between said one of said right-hand and left-hand frame sections and another of said right- and left-hand front frame sections.

6. The self-propelled cane harvester, as defined in claim 4, wherein said powered device is an extensible and retractable hydraulic actuator having a first end pivotally mounted to said remaining section of said frame; and a steering linkage being mounted between a second end of said hydraulic actuator and said right- and left-hand front frame sections and said boom.

7. The self-propelled cane harvester defined in claim 6 wherein said steering linkage includes: right- and left-hand crank arms respectively fixed to said right- and left-hand front frame sections and a middle crank arm fixed to said boom; a tie link coupled between said right- and left-hand crank arms; and a drag link coupled between one of said right- and left-hand crank arms and said middle crank arm.

8. In a self-propelled cane harvester, including a main frame supported on a pair of rear drive wheels, a pair of front steerable wheels, a powered steering arrangement coupled to said pair of front steerable wheels, a topper mechanism mounted to a forward location of the main frame, and a pair of row dividers respectively mounted to forward ends of opposite sides of said main frame, an improved topper mechanism comprising: said topper mechanism including a boom mounted to said main frame for pivoting about a vertical swing axis located centrally between said pair of front steerable wheels; and said powered steering arrangement being coupled to said boom for steering it in concert with said steerable wheels.

* * * * *